(12) United States Patent
Bergstrom et al.

(10) Patent No.: US 6,914,929 B1
(45) Date of Patent: Jul. 5, 2005

(54) RADIATION-HARDENED RLG READOUT

(75) Inventors: James W. Bergstrom, New Brighton, MN (US); J. Allen Cox, New Brighton, MN (US); Teresa A. Fritz, Eagon, MN (US)

(73) Assignee: Honeywell International, Inc., Morristown, NJ (US)

( * ) Notice: Subject to any disclaimer, the term of this patent is extended or adjusted under 35 U.S.C. 154(b) by 1826 days.

(21) Appl. No.: 07/290,140

(22) Filed: Dec. 27, 1988

(51) Int. Cl.[7] .............................................. H01S 3/083
(52) U.S. Cl. ......................................... 372/94; 356/350
(58) Field of Search .............................. 372/92, 93, 94, 372/108; 356/350, 468

(56) References Cited

U.S. PATENT DOCUMENTS

| | | | |
|---|---|---|---|
| 3,577,094 A | | 5/1971 | Tomilinson |
| 4,271,397 A | * | 6/1981 | Stiles et al. .................... 372/94 |
| 4,559,500 A | * | 12/1985 | McDermid et al. ............ 372/94 |
| 5,359,414 A | * | 10/1994 | Howard et al. .............. 356/468 |
| 5,430,543 A | * | 7/1995 | Howard ....................... 356/468 |

OTHER PUBLICATIONS

"Method of Fabricating High Efficiency Binary Planar Optical Elements".
"Binary Lenses for Use at 10.6 Micrometers", by Swanson et al., Optical Engineering, Sep./Oct. 1985, vol. 24, No. 5.
"The Phase Fresnel Lens" by Miyamoto, Journal of the Optical Society of America, vol. 51, No. 1, Jan. 1961.
"Optics", by Hecht et al., Addison–Wesley Publishing Company.

* cited by examiner

Primary Examiner—Léon Scott, Jr.
(74) Attorney, Agent, or Firm—Matthew S. Luxton

(57) ABSTRACT

A diffractive optical element is interposed between the exit beams from a ring laser gyro readout and the photodetectors for detecting such beams. The diffractive optical element permits the use of photodetectors much reduced in size in order to minimize gyro performance degradation due to radiation.

14 Claims, 2 Drawing Sheets

Fig. 2
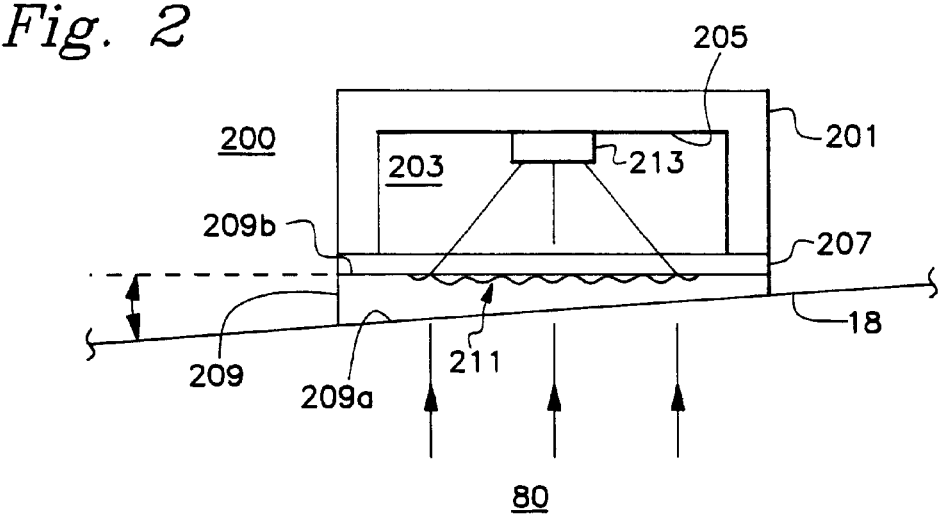
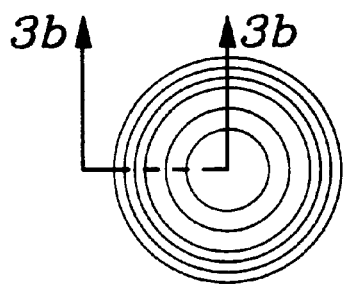
Fig. 3a
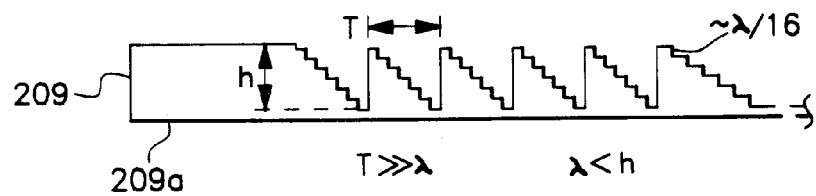
Fig. 3b

RADIATION-HARDENED RLG READOUT

BACKGROUND OF THE INVENTION

The present invention relates to a ring laser angular rate sensor, usually referred to as a ring laser gyroscope. More particularly it relates to a readout apparatus for such a ring laser gyroscope.

A ring laser gyro is a laser apparatus having a ring type resonant cavity, or simply a ring resonator. The ring resonator is commonly constructed of a block having a plurality of interconnecting tunnels in the shape of a polygonal path such as, for example, a triangular or rectangular path. The laser beam is directed around the ring path by suitable mirrors appropriately positioned at the intersections of pairs of interconnecting tunnels. In ring laser gyros there are commonly two laser beams traveling in opposite directions relative to each other around the polygonal ring path. The positioning of the mirrors in the corners of the polygonal ring path direct the laser beams through the tunnels of the resonant cavity. At one of the corners, the mirror is partially transmissive whereby major portions of the counter-propagating beams are reflected, while small portions of each of the counter-propagating beams are transmitted through the mirror into a readout assembly. Some examples of ring laser gyros are shown and described in U.S. Pat. Nos. 3,373,650 and 3,467,472 issued to Killpatrick, and U.S. Pat. No. U.S. Pat. No. 3,390,606 issued to Podgorski, these being incorporated herein by reference.

The aforementioned readout assembly generally comprises a prismatic structure for combining those small portions of each of the counter-propagating beams to produce either an interference fringe pattern comprised of light intensity bands with directional movement, or alternatively a light intensity spot which varies in intensity between high and low values at a rate proportional to the frequency difference between the counter-propagating beams. The readout assembly may be either "block mounted" or displaced from the block. U.S. Pat. No. 3,373,650 illustrates a readout assembly which is displaced from the gyro block. In U.S. Pat. No. 3,373,650, the readout assembly is comprised of a corner prism which combines the small portions of the counter-propagating beams which are transmitted through the partially transmissive mirror, and recombines them to form an interference fringe pattern.

U.S. Pat. No. 4,582,429, issued to Steven P. Callaghan, U.S. Pat. No. 4,677,641 issued to Theodore J. Podgorski, and U.S. Pat. No. 4,712,917 issued to Bergstrom et al. all show block mounted readout assemblies which are all solid structures comprised of one or more prism elements. These prism elements combine those portions of the counter-propagating laser beams, transmitted through the partially transmissive mirror, to produce an interference fringe pattern or light intensity spot. These patents are also incorporated herein by reference.

The aforementioned Callaghan and Bergstrom et al. Patents disclose prismatic structures which combine the small portions of the counter-propagating laser beams to produce an interference light spot. The Podgorski Patent shows a unitary solid structure prism for producing an interference fringe pattern; and the Callaghan and Bergstrom et al. Patents show a solid structure prism comprised of a pair of prisms mounted to a mirror assembly substrate. All of the just referred to readout assemblies are all intended to be directly mounted to the ring laser gyro block.

Associated with the readout assemblies of the prior art is at least one photodetector which is generally responsive to either the interference fringe pattern or the interference light spot.

Readout assemblies known in the prior art for ring laser gyros are particularly susceptible to radiation-induced noise, i.e., unwanted signal or effect generally caused by nuclear radiation, which may result in poor sensor performance due to rotation rate information errors. The magnitude of the sensitivity to radiation-induced noise is thought to be directly related to the size of the photodetectors. The size of the detectors being determined by the size of the output light spot or interference fringe pattern.

BRIEF DESCRIPTIONS OF THE INVENTION

The object of the present invention is to produce a small light intensity spot or light interference fringe pattern so as to lower the required size of the photodetectors which respond to such patterns, and at the same time keep package size to a minimum.

In the present invention, an optical means receives the small portions of the counter-propagating waves which are transmitted through one of the reflecting means at one of the corners of the gyro. Exiting from the optical means is a light beam which is directed toward a photodetector through a diffractive optical element, thereby causing the light beam to converge at the photdetector.

DETAILED DESCRIPTION OF THE DRAWINGS

FIG. 2 illustrates in more detail the readout of FIG. 1.

FIGS. 3a and 3b show a diffractive optical element.

DETAILED DESCRIPTION OF THE INVENTION

Figure 1:
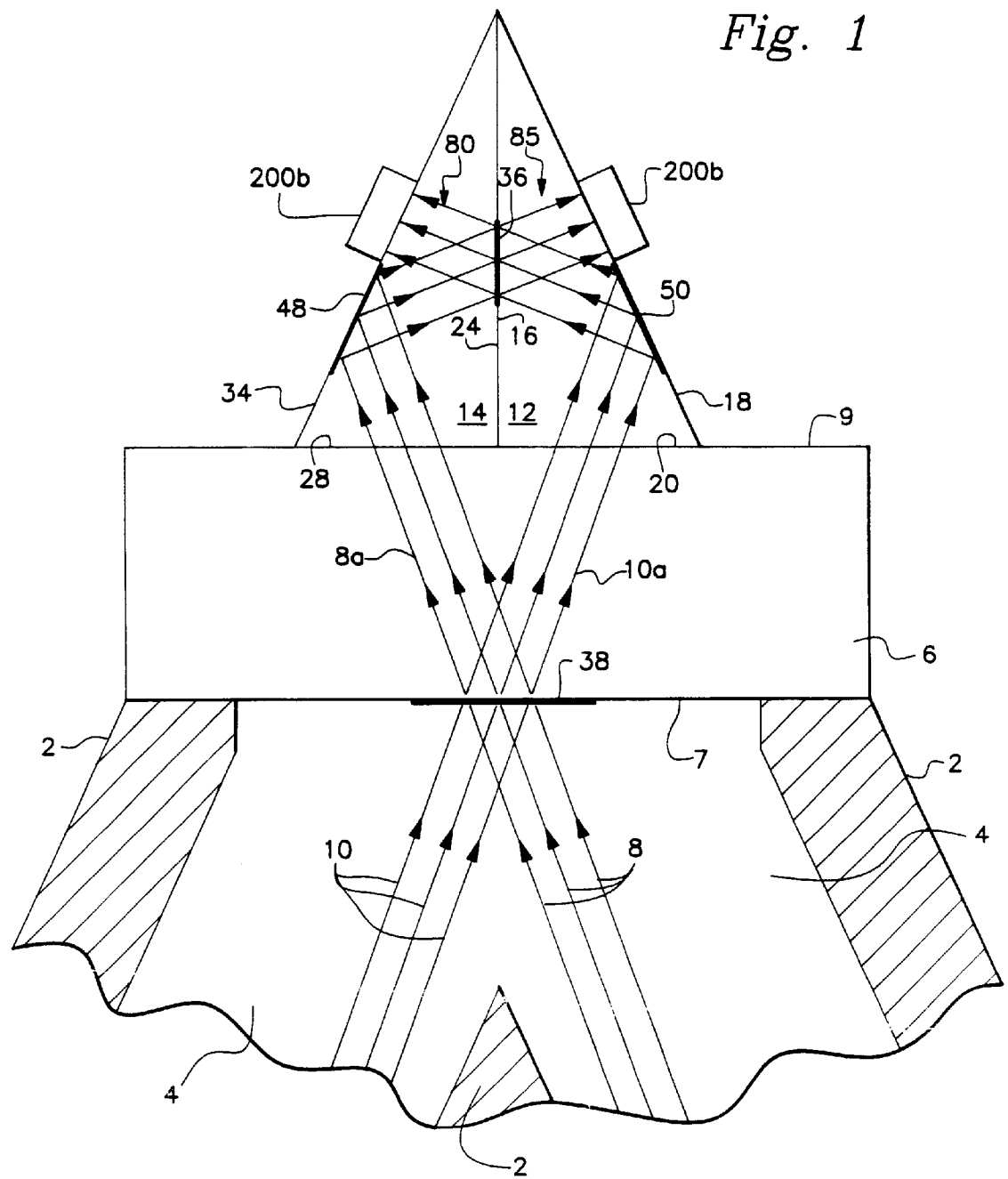
FIG. 1 illustrates a readout assembly in accordance with the present invention.

Referring now to the drawings in more detail, there is shown in FIG. 1 a schematic diagram similar to that shown in U.S. Pat. No. 4,582,429. Particularly, FIG. 1 represents a readout corner of a ring laser gyro of the triangular type as shown in the aforementioned U.S. Pat. No. 3,390,606.

Illustrated in FIG. 1, a thermally and mechanically stable block 2 has formed therein a resonant cavity 4 (partially shown). Cavity 4 is sealed at each of the corners by an output substrate 6 which includes a partially reflecting mirror means 38 generally comprised of a plurality of alternating layers of two different dielectric materials, e.g., titanium oxide, and silicon dioxide.

For triangular ring laser gyros, there are three such corners with suitable substrates 6 sealing each of the three corners. Cavity 4 is filled with a suitable lasing gas which is excited by an appropriate voltage in accordance with well established principles for lasers. By an appropriate electrical exciting means, first and second laser beams 8 and 10, respectively, are established to travel in opposite directions about the closed-loop or ring path of the assembly in a well known manner.

As is particularly illustrated in FIG. 1, substrate 6 includes a first surface 7 thereof having a partially transmissive mirror coating 38 thereon, whereby a portion of each of the two impinging laser beams 8 and 10 are transmitted through the surface 7 of substrate 6; and a larger portion of each impinging beam is reflected back into resonant cavity 4. Those portions of beam 8 and 10 which pass through mirror 38 and substrate 6 are identified as beams 8A and 10A, respectively.

Coupled to substrate 6 are a pair of prisms 12 and 14 which are strategically located to direct the light paths followed by beams 8A and 10A, and combine portions of these beams so as to exit from the prismatic structure for subsequent photodetection. The prismatic structure illustrated produces light beams 80 and 85 being characteristic of selected functions of beams 8 and 10, as will be subsequently described.

Prism 12 includes surfaces 16, 18, and 20. Surface 16 is perpendicular to surface 20, and surface 18 is at a selected acute angle relative to surface 16. Similarly, prism 14 includes surfaces 24, 28, and 34. Surface 24 is perpendicular to surface 28, and surface 34 is at a selected acute angle relative to surface 24. Preferably, prisms 12 and 14 are symmetrical. Further, in the embodiment illustrated, the acute angle selected is in the order of 30 angular degrees.

Surfaces 18 and 34 each have a wave reflecting coating thereon as identified by numerals 50 and 48 on surfaces 18 and 34, respectively. Further, a beam splitter coating 36 is provided on either surface 24 or 16.

Prisms 12 and 14 are positioned such that surfaces 20 and 28 are co-planar and positioned in contiguous juxtaposition with respect to surface 9 of substrate 6. Further, surfaces 16 and 24 are fixed together by suitable means, e.g., optical contact bonding or an adhesive.

The arrangement of substrate 6, prisms 12 and 14, and wave reflecting coatings 48 and 50, and beam splitter coating 36 is to provide light beams 80 and 85 exiting from surfaces 34 and 18, respectively. These beams are sometimes referred to as "double beam signals" since they are a composite beam consisting of portions of beams 8 and 10 passing through partially reflecting mirror 38. Beams 85 and 80 exit from prisms 12 and 14, respectively, and impinge upon substantially identical detector assemblies 200*b* and 200*b* as particularly described in FIG. 2. Exit beams 80 and 85 produced by the prismatic structure of FIG. 1 are of the variety for creating an interference light spot, described earlier, which varies in intensity as opposed to the variety which creates an interference fringe pattern.

The path of the waves of the prismatic structure of FIG. 1 will now be described. Laser beam 8 impinges upon partially transmitting mirror 38. A portion 8*a* of beam 8 is refracted by substrate 6 and transmitted through surface 9 of substrate 6. Beam 8*a*, in turn is reflected by means 48 to impinge upon beam splitter 36. Beam splitter 36 functions to split beam 8*a* into a reflected portion which becomes a component of beam 80, and a transmitted portion which becomes a component of beam 85.

Similarly, laser beam 10 impinges upon partially transmitting wave reflecting means 38. A portion 10*a* of beam 10 is refracted by substrate 6 and transmitted through surface 9 of substrate 6. Beam 10*a*, in turn is reflected by means 50 to impinge upon beam splitter 36. Beam splitter 36 also functions to split beam 10*a* into a reflected portion which becomes a component of beam 85, and a transmitted portion which becomes a component of beam 80.

The construction of prisms 12 and 14, and particularly the location of wave reflecting means 48 and 50, and beam splitter 36, and the angular relationships between all of the prism surfaces and their relationship to the surface 9 of substrate 6 are such to cause beams 80 and 85 to be composed of co-linear and coexisting portions of beams 8*a* and 10*a*. The combined beams 80 and 85 are therefore a function of the phase relationship between beams 8 and 10.

The prismatic structure as just described is similar to that shown and described in U.S. Pat. No. 4,582,429.

A detector assembly 200 in accordance with the present invention will now be described with reference to FIG. 2. Detector assemblies 200*a* and 200*b* are substantially identical, and each are separately responsive to the double beam signals 80 and 85 which have an intensity which varies as a function of the phase difference between beams 8 and 10. Detectors 200*a* and 200*b* have output signals (not shown) which are directly related to the intensity of a light "spot" which varies in intensity due to the interference between the two combined beams, namely the double beam signal. The detector output signals therefore provide sensor rotation information in a well known manner.

If beam splitter 36 is constructed by way of a low absorption or a low loss optical coating such as a dielectric material, the reflected and transmitted beams of an impinging beam will be substantially complementary or 180° out of, phase with each other. Accordingly, the first and second double beam signals, 80 and 85, will also be complementary or 180° out of phase with each other. The detector output signal may be differentially compared to provide rotation rate information.

Detector assembly 200 is comprised of a cylindrical substrate 201 having an aperture 263 with an inner bottom surface 205. Aperture 203 is sealed by an optically transmissive substrate 207. Fixed to substrate 207 is a second optically transmissive substrate 209 having a diffractive optical element 211 imbedded therein. A photodetector 213 is secured to surface 205.

FIGS. 3*a* and 3*b* illustrate a Fresnel lens which forms the diffractive optical element 211. Referring to the drawings, substrate 209 can be etched in a manner to form the Fresnel lens having concentric rings having an increasing circular fringe spacing, T, and fixed step height as particularly illustrated in FIG. 3*b*. Preferably, substrate 209 may be a very thin substrate of fused silica. It is also preferable that the beam be aligned with the center of the Fresnel lens.

The detector assembly 200 is intended to be fixed, for example, to surface 18 of prism 12 such that the double beam signal 85 is directed through the diffractive optical element 211 so that the double beam signal is focused by the diffractive optical element at a point somewhat behind the light sensitive surface of photodetector 213. It is intended that the cross-section of the photodetector 213 match the cross-section of the resulting converging beam at the detector surface.

By use of the diffractive optical element, beams 80 and 85 are made to converge at a single focal point of the diffractive optical element. By virtue of the detector intercepting the resultant optical beam in front of the focal point, the detector size can be selected.

Preferably, the relationship between the double beam signal and the diffractive optical element is such that the double beam signal is incident on the diffractive optical element at a slight angle in order to minimize any retroreflection back into the ring laser. In FIG. 2, substrate 209 is shown to have non-parallel surfaces 209*a* and 209*b* such that surface 209*b* is at a slight angle relative to surface 18. This cause the impinging beam to be refracted (not shown) by the optical elements 209 and 207.

There of course, many alternative embodiments for the detector assembly employing the diffractive optical element in accordance with present invention. Specifically, the diffractive optical element, for example the Fresnel lens may be directly etched on substrate 207 acting as the hermetically sealing window.

Although the diffractive optical element in the form of a Fresnel lens has been illustrated, it should be understood to those skilled in the art that the diffractive optical element could also be realized by either etching or appropriate application of optical coatings on either substrate 209 or window substrate 207.

There are, of course, many variations in the implementation of a diffractive optical element in order to achieve the intended function as described in the illustrated embodiment. Specifically, two confocal (optical elements having the same foci) diffractive optical elements could be utilized to implement a focal system (foci at infinity). These two confocal diffractive optical elements can be separated in order to match a collimated beam to the area of a photodetector. This assembly will be somewhat thicker and although somewhat more complicated. However, it provides an optical system which minimizes retroreflection back into the ring laser.

Still, alternatively, a single diffractive optical element could be used in a higher order, off axis mode. Such a diffractive optical element would be very sensitive to polarization, and this feature could be used to advantage by matching it to the polarization of the incident beams.

It should be understood therefore, that various changes and modifications may be made to the invention shown in the accompanying Figures and described herein as will be apparent to those skilled in the art, and are within the true spirit and scope of the present invention. It should be particularly noted than an interference fringe pattern may also be reduced in size in accordance with the principles of the present invention other than as illustrated in the drawings herein.

The embodiments of the invention in which an exclusive property or privilege is claimed are defined as follows:

1. A readout apparatus for a ring laser gyro wherein a laser gain medium in combination with a plurality of wave reflecting means are positioned to form an optical ring path which provides at least two counter-propagating waves traveling about said ring path and exhibiting a phase difference as a function of the rotation of said gyro, the readout apparatus comprising:

one of said wave reflecting means being partially transmissive of a first wave which is a portion of one of said counter-propagating waves impinging thereon, and transmitting a second wave which is a portion of the other one of said counter-propagating waves also impinging thereon;

light directing means for receiving said first and second waves, and optically combining said first and second waves for establishing a first light beam exiting from a first surface of said first optical means, said first light beam exiting from said optical means having a first beam size and having electromagnetic characteristics representative of the phase difference between said two counter-propagating waves; and first diffractive optical means (i) being positioned to receive said first light beam impinging thereon, and (ii) causing said first light beam to be optically diffracted and reduced in beam size at a first selected point.

2. The readout out apparatus of claim 1 wherein:

said light directing means further includes means for optically combining said first and second wave and for establishing a second light beam exiting from a second surface of said first optical means, said second light beam exiting from said second surface having a second beam size and having electromagnetic characteristics representative of the phase difference between said counter-propagating waves shifted in phase relative to said first light beam; and said readout apparatus further comprising a second diffractive optical means (i) positioned to receive said second light beam impinging thereon, and (ii) causing said second light beam to be optically diffracted and reduced in beam size at a second selected point.

3. The apparatus of claim 2 wherein said first and second diffractive optical means are Fresnel lenses.

4. The apparatus of claim 2 wherein said readout apparatus comprises first and second photodetectors positioned at said first and second selected points, for providing an output signal indicative of the intensity of said first and second light beams impinging thereon respectively.

5. The readout apparatus of claim 1 wherein said first diffractive optical means is a Fresnel lens.

6. The apparatus of claim 1 wherein said light directing means is a prismatic structure having a plurality of exterior surfaces.

7. The apparatus of claim 1 where said light directing means is a solid structure comprising at least a pair of prisms in which said prisms are joined together at a first interface and including a beam splitter at said interface, and each of said prisms includes an exterior surface having a wave reflecting means thereat for reflecting waves impinging thereon back into said solid structure.

8. The apparatus of claim 1 wherein said readout apparatus comprises a first detector positioned at said first selected point for providing an output signal indicative of the intensity of said first light beam.

9. The apparatus of claim 7 further comprising:

a first substrate having an aperture partially therethrough extending from end surface to an inner surface;

said first detector being a photodetector secured to said inner surface;

a first optically transmissive substrate having first and second oppositely opposing surfaces, said first surface covering said aperture and fixed to said end surface; and said first optically transmissive substrate serving, in part, as said diffractive: optical means.

10. The apparatus of claim 9 wherein a selected one of said first and second surfaces of said first optically transmissive substrate is etched in a manner to provide a Fresnel: lens.

11. The apparatus of claim 9 wherein:

a selected one of said first and second surfaces of said first optically transmissive substrate is altered so as to provide said diffractive optical means.

12. The apparatus of claim 9 wherein said second surface of said first optically transmissive substrate is rigidly coupled to said light directing means.

13. The apparatus of claim 1 further comprising:

a first substrate having an aperture partially therethrough extending from an end surface to an inner surface;

said first detector being a photodetector secured to said inner surface;

a first optically transmissive substrate having first and second surfaces, said first surface said aperture and fixed to said end surface;

a second optically transmissive substrate having first and second surfaces, said second surface of said first and second optically transmissive substrates being fixed together; and a selected one of said first and second surfaces of either one of said first and second optically transmissive substrates being altered to provide said diffractive optical means.

14. The apparatus of claim 13 wherein said second surface of said second optically transmissive substrate is etched in a manner to provide a Fresnel lens.

* * * * *